Figure 1:
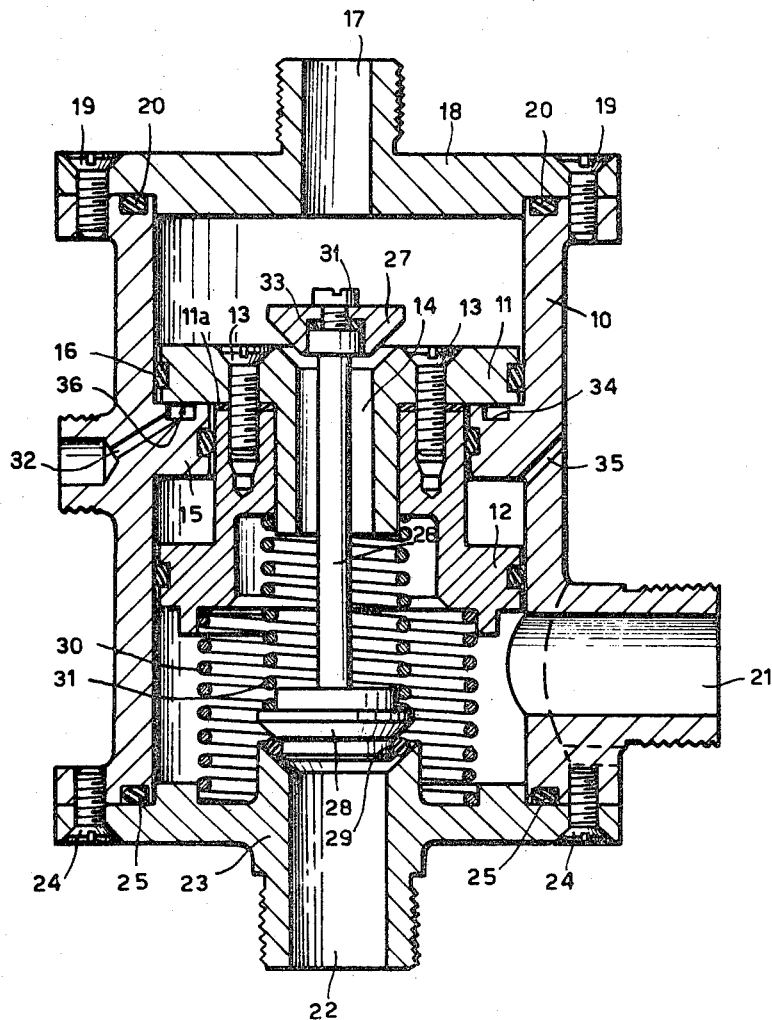

United States Patent
Michellone

[15] 3,702,622
[45] Nov. 14, 1972

[54] PNEUMATIC PRESSURE REDUCING VALVE WITH RAPID DISCHARGE

[72] Inventor: Giancarlo Michellone, Strada delle Camporelle, Cambiano, Italy

[22] Filed: Jan. 27, 1971

[21] Appl. No.: 110,230

[30] Foreign Application Priority Data

Feb. 3, 1970  Italy.....................67329 A/70

[52] U.S. Cl.................................137/107, 303/22 A
[51] Int. Cl..........................B60t 8/18, G05d 7/00
[58] Field of Search.............137/102, 107; 303/22 A

[56] References Cited

UNITED STATES PATENTS

| | | | |
|---|---|---|---|
| 2,858,840 | 11/1958 | Wright | 137/107 X |
| 2,406,284 | 8/1946 | Fitch | 137/102 |
| 3,022,118 | 2/1962 | Dobrikin | 137/102 X |
| 3,228,731 | 1/1966 | Valentine | 137/102 X |
| 3,275,009 | 9/1966 | Frania et al | 137/107 X |

*Primary Examiner*—M. Cary Nelson
*Assistant Examiner*—David J. Zobkiw
*Attorney*—Sughrue, Rothwell, Mion, Zinn & Macpeak

[57] ABSTRACT

A pressure reducing valve has a plunger having an axial hole, which plunger is movable in a valve body between two extreme positions defined by stops and under the action of resilient means. A stem valve is movable in the axial hole and is adapted to assume a stop position such that it closes the axial hole when the plunger is in a rest position and that it leaves the hole open when the plunger is in the other positions. A control aperture admits a control pressure to a reaction surface on the plunger in order to produce a regulable increase in the resistance offered by the resilient means to the movement of the plunger.

1 Claim, 2 Drawing Figures

PNEUMATIC PRESSURE REDUCING VALVE WITH RAPID DISCHARGE

The present invention relates to a pneumatic pressure reducing valve with rapid discharge, of which the reduction ratio is controllable by means of another pneumatic pressure.

It is to be noted that the present invention can be used more particularly but not exclusively in braking installations which apply braking correction and/or prevent the wheels of the vehicle from skidding.

Recent developments in vehicle braking installations which prevent the wheels from skidding, or anti-skid braking installations, which latter expression will be used hereinafter, have led to a need for valves, more particularly pneumatic valves, which are adapted to be controlled by means of a control pressure.

A main object of the present invention is therefore to provide a pneumatic pressure reducing valve with rapid discharge, in which it is possible to control the reduction ratio between the inlet and outlet pressures by means of a further pneumatic control pressure.

A further object of the invention is to provide a valve of the aforesaid type which is of relatively simple structure and moderate cost.

A further object of the invention is to provide a valve of the aforesaid type which offers maximum certainty of satisfactory operation, so that it can be used in anti-skid braking installations. The invention achieves the aforesaid and other objects and advantages with a pressure reducing valve controllable by means of a control pressure, characterized in that it comprises a. a plunger having an axial hole and movable in a valve body between two extreme positions defined by stops and by the action of resilient resisting means.

b. a valve having a stem and movable in the axial hole of the plunger and adapted to assume a stop position such that the said stem valve closes the axial hole and therefore the passage between a chamber upstream and a chamber downstream from the plunger in the body when the plunger is in a first rest position and that the stem valve leaves the hole substantially open when the plunger is in the other position, and c. a control aperture for the admission of a control pressure to a reaction surface on the plunger in order to produce a regulable increase in the resistance offered by the resilient means to the movement of the plunger.

Figure 2:
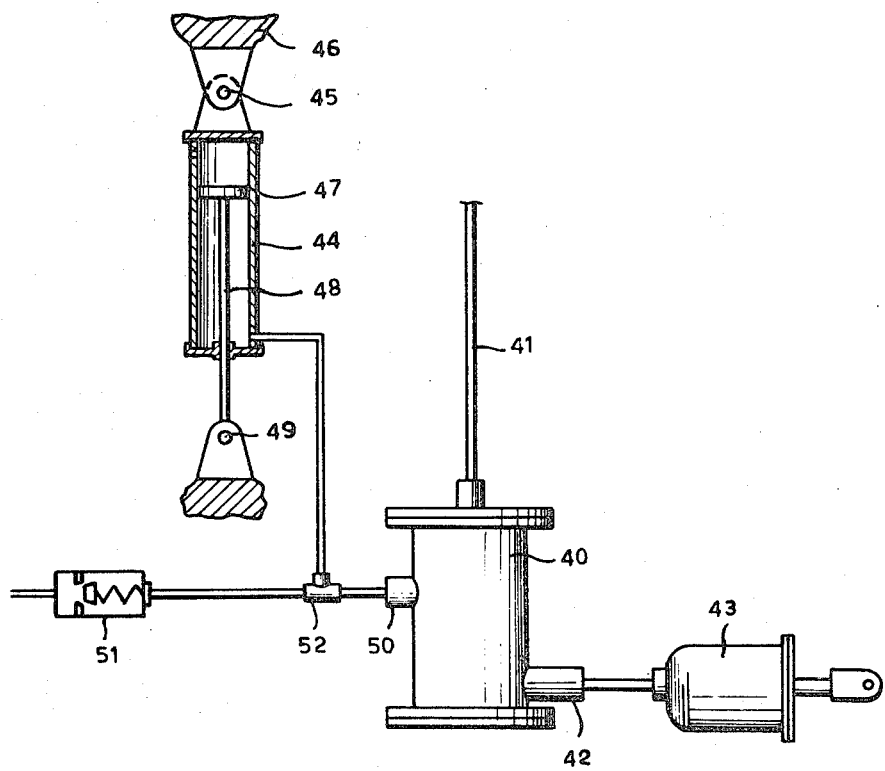

Further objects, advantages and features of the invention will be made clear by the following particular description, given by way of example, of a preferred embodiment of the invention and a way of using this embodiment, with reference to the accompanying drawings, in which FIG. 1 shows a preferred embodiment of a pressure reducing valve in accordance with the invention, in axial section, and FIG. 2 very diagrammatically illustrates the pneumatic circuit of a braking installation which applies braking correction and in which a reducing valve in accordance with the invention is incorporated.

With reference to FIG. 1, a pressure reducing valve in accordance with the invention comprises a substantially cylindrical body 10 having an axial hole in which a plunger slides; the plunger consists of two parts 11 and 12 secured to one another by screws 13; a seal 11a is interposed between the two parts. An axial hole 14 extends through the part 11. The stroke of the plunger 11, 12 is limited by a shoulder 15. Suitable O-ring seals 16 ensure pressure tightness between the circuit above and the circuit below the plunger 11, 12. Pressure enters the valve through an axial hole 17 extending through a top cover 18 secured by screws 19; an O-ring seal 20 is interposed between the cover and the body; pressure leaves the valve through a radial hole 21. A bottom wall 23 is also attached by screws 24, and an O-ring is interposed between the wall and the body; a further passage 22 in this wall is used for rapid discharge of the pressure in an operating cylinder not shown in the drawing, which is downstream from the outlet 21. A valve 26 with a stem is movable in the axial hole 14 of the plunger 11, 12 and is provided with two heads; one head 27 is secured to the stem by a screw 31 and a sealing O-ring 33 is interposed between the head and the stem; this head is adapted to bear against a seat at the top end of the axial aperture 14 of the plunger 11, 12 so as to close this aperture; the other head 28 provided with an O-ring 29 is adapted to bear against a seat formed in the top of the rapid discharge aperture 22. A resisting spring 30 is used for resisting the downward movement of the plunger 11, 12, and a centering spring 31 is used for centering the stem valve 26 with respect to the plunger 11, 12. A control aperture 32 extends through the peripheral wall of the body 10; the presence of an annular channel 34 formed in the top surface of the shoulder 15 permits a control pressure to reach the reaction section 36 on the plunger 11, 12 through this inlet.

An outlet 35 at the bottom edge of the shoulder 15 permits the escape of the air contained between the plunger 11, 12 and the shoulder 15.

In the absence of delivery pressure from the inlet 17, the plunger 11, 12 is raised by the resisting spring 30 and is in contact with the top head 27 of the stem valve 26. The rapid discharge outlet 22 is open. For the moment it is assumed that there is no control pressure in the aperture 32. When incoming pressure arrives through the inlet 17, the pressure acts on the plunger 11, 12 and on the stem valve 26, forcing the unit as a whole downwards until the bottom head 28 of the stem valve bears against the seat in the rapid discharge aperture 22, whereas the plunger continues to descend and finally bears against the shoulder 15, so that the passage for the delivery pressure to the outlet 21 is opened and pressure is delivered to the operating cylinder not shown in the drawing. When the incoming pressure ceases, the plunger 11,12 rises under the action of the resisting spring 30 and the pressure downstream from the outlet 21 so that the seat in the axial hole 14 in the plunger 11,12 bears against the top head 27 of the stem valve 26 and at the same time the rapid discharge aperture 22 is opened. The downstream pressure is therefore rapidly discharged through the rapid discharge aperture 22. The discharge continues so long as the incoming pressure remains less than the force exerted by the downstream pressure and by the resisting spring 30. The discharge is divided so as on the average to satisfy the relationship $$P_u A_2 + F = P_i A_1$$

(friction forces, which are practically negligible, are ignored). Here, $P_u$ is the outgoing pressure or pressure downstream from the plunger 11, 12, $P_i$ is the incoming or delivery pressure, $A_1$ is the total area on which the incoming pressure acts, $A_2$ is the area of the plunger on which the downstream pressure acts and F is the reaction force of the resisting spring. The downstream pressure is therefore $$P_u = \frac{A_1}{A_2} P_i - \frac{F}{A_2}$$

When a control pressure $P_c$ is now applied to the control aperture 32, the control pressure acts on the reaction section 33, of which the area will be indicated by $A_3$, and its action is added to that of the resisting spring and the downstream pressure $P_u$. In this case the equilibrium relationship will be $$P_u A_2 + P_c A_3 + F = P_i A_1$$

whence $$P_u = \frac{A_1}{A_2} P_i - \frac{A_3}{A_2} P_c - \frac{F}{A_2} \qquad (1)$$

It is thus possible to control the reduction ratio between the incoming pressure and the outgoing pressure of the valve additively by means of a control pressure, with a control range which depends on the sizes of the area $A_1$, $A_2$ and $A_3$.

A possible use of the pressure reducing valve of the invention for braking correction in regard to load in an automobile braking installation will now be described with reference to FIG. 2. In FIG. 2 the pressure reducing valve of the invention is shown diagrammatically at 40. Pressure from a master cylinder is applied through a duct 41, and the outgoing pressure is transmitted to a brake cylinder 43 through an outlet 42. 44 indicates a cylinder pivoted at 45 to a point on the frame 46; a plunger 47 slides in this cylinder against the reaction of the air contained in the cylinder, and a rod 48 of the plunger 47 is connected at 49 to an axle of the vehicle. When the pressure in the cylinder 44 falls below the adjusted value as a result of losses and leakage, a non-return valve 51 for compensating the adjustment, which is subjected to the action of a spring, establishes communication between a service reservoir (not shown in the drawing) and the cylinder 44 through a junction 52 and thus returns the said pressure to the adjusted value at each instant. An increase in the load on the vehicle causes the frame 46 to move towards the axle 49, thus reducing the pressure in the cylinder 44 and therefore the pressure applied to the control inlet 50 of the pressure reducing valve of the invention.

The relationship (1) shows that the pressure $P_u$ transmitted to the power device increases when the control pressure $P_c$ decreases and therefore when the load carried by the vehicle increases. The braking action will therefore be stronger when this load is greater.

Another possible use of the invention, not shown in the drawings, consists in employing the reducing valve of the invention as a pressure limiting valve. In this case the control pressure will be the outgoing pressure itself, appropriately applied to the control inlet.

Other important uses of the invention are described in applicant's co-sending patent application Ser. No. 110,232 filed Jan. 27, 1971.

What we claim is:

1. A pressure reducing valve comprising a hollow cylinder having an inlet port, an outlet port, an exhaust port and a control port; a plunger having two flanges at opposite ends of an intermediate reduced diameter portion an an axial bore extending through the flanges and the reduced diameter portion, said plunger being slidable in the hollow cylinder between a first position and a second position, one flange of the plunger defining an inlet chamber with the wall of said cylinder adjacent the inlet port and the opposite flange defining an outlet chamber with the wall of said cylinder adjacent the outlet and exhaust ports; said cylinder having an internal annular shoulder disposed between the flanges of said plunger, said shoulder having an annular groove facing the side of said one flange opposite said inlet chamber and means communicating said groove with the control port; resilient means disposed in said outlet chamber biasing said plunger to said first position where said opposite flange rests against said shoulder; a two-headed stem valve movably mounted in said axial bore of the plunger, spring means biasing one head of the stem valve into engagement with said exhaust port to close said exhaust port when said plunger is in said second position, the other head of said stem valve being arranged to cooperate with the axial bore in said one flange whereby said axial bore will be open when said plunger is disposed in said second position and whereby when said plunger is disposed in said first position, said one head of said stem valve will open said exhaust port and the other head of said stem valve will close said axial bore; said plunger being shiftable from said first position to said second position where said one flange rests against said shoulder when a pressure in said inlet chamber exerts a force on said plunger exceeding the combined force of the pressure in said control port, the pressure in said outlet chamber and the force of said resilient means.

* * * * *